United States Patent
Lacey

(10) Patent No.: US 6,835,236 B2
(45) Date of Patent: Dec. 28, 2004

(54) MOLDED CORE FILTER DRIER WITH FILTER MEDIA MOLDED TO CORE

(75) Inventor: Michael G. Lacey, Marthasville, MO (US)

(73) Assignee: Sporlan Valve Company, Washington, MO (US)

(*) Notice: Subject to any disclaimer, the term of this patent is extended or adjusted under 35 U.S.C. 154(b) by 0 days.

(21) Appl. No.: 10/195,257

(22) Filed: Jul. 15, 2002

(65) Prior Publication Data
US 2003/0140793 A1 Jul. 31, 2003

Related U.S. Application Data

(63) Continuation-in-part of application No. 10/057,207, filed on Jan. 25, 2002.

(51) Int. Cl.[7] .......................... B01D 29/00; F25B 43/00
(52) U.S. Cl. ............................ 96/134; 55/495; 55/514; 62/474; 210/496; 210/DIG. 6; 210/DIG. 7
(58) Field of Search ........................ 96/108, 134, 147; 55/420, 490, 491, 495, 514; 62/474; 210/282, 446, 496, DIG. 6, DIG. 7

(56) References Cited

U.S. PATENT DOCUMENTS

| | | | | |
|---|---|---|---|---|
| 1,804,836 A | * | 5/1931 | Loranger et al. | ............. 62/474 |
| 1,866,659 A | | 7/1932 | Litle, Jr. | |
| 2,148,770 A | | 2/1939 | Mittendorf | |
| 2,548,965 A | | 4/1951 | Gaugler | |
| 2,551,426 A | * | 5/1951 | Eaker | ............................ 62/77 |
| 2,556,292 A | | 6/1951 | Newcum | |
| 2,659,128 A | | 11/1953 | Baldwin, Jr. et al. | |
| 2,781,912 A | * | 2/1957 | Newcum | .................... 210/295 |
| 3,025,233 A | | 3/1962 | Figert | |
| 3,254,771 A | * | 6/1966 | Sicard | ........................ 210/266 |
| 3,838,578 A | | 10/1974 | Sakasegawa et al. | |
| 4,177,145 A | | 12/1979 | Schumacher | |
| 4,266,408 A | * | 5/1981 | Krause | ........................ 62/474 |
| 4,320,000 A | | 3/1982 | Lange et al. | |
| 4,474,661 A | | 10/1984 | Nearpass et al. | |
| 4,601,179 A | | 7/1986 | Johansson | |
| 4,908,132 A | | 3/1990 | Koval et al. | |
| 4,954,252 A | | 9/1990 | Griffin et al. | |
| 5,097,866 A | | 3/1992 | Shapiro-Baruch et al. | |
| 5,179,780 A | | 1/1993 | Wintersteen et al. | |

(List continued on next page.)

FOREIGN PATENT DOCUMENTS

| | | |
|---|---|---|
| DE | 827653 | 1/1952 |
| DE | 19955898 | 5/2001 |
| EP | 0613710 | 9/1994 |
| FR | 1262641 | 6/1961 |
| JP | 08086542 | 2/1996 |
| JP | 08121909 | 5/1996 |

Primary Examiner—Frank M. Lawrence
(74) Attorney, Agent, or Firm—Polster, Lieder, Woodruff & Lucchesi, L.C.

(57) ABSTRACT

This filter-drier for removing moisture from a refrigerant includes a casing having an inlet for receiving refrigerant, an outlet for discharging and a molded core disposed in the casing between inlet and outlet. In one embodiment, the core includes an outer surface in part engaging the inner surface of the casing. Axial movement of the core is prevent by bonding with the casing or by an indentation protruding into the core or both. Another embodiment includes a filter media pad bonded to the core sufficiently to hold the pad in place eliminating the need for outlet support screens. In another embodiment suitable for reversible operation in a heat pump system, the filter-drier includes a hollow cylindrical core having a filter media bonded to the core and defining a filter media lined passage, the core being held in place by end plates having opposed axial check valves and offset check valves.

15 Claims, 6 Drawing Sheets

U.S. PATENT DOCUMENTS

| | | | |
|---|---|---|---|
| 5,435,153 A | 7/1995 | Hutchinson et al. | |
| 5,440,898 A | 8/1995 | Starr | |
| 5,562,427 A | 10/1996 | Mangyo et al. | |
| 5,580,451 A * | 12/1996 | Tack | 210/266 |
| 5,650,563 A * | 7/1997 | Cooper et al. | 73/40.7 |
| 5,882,517 A | 3/1999 | Chen et al. | |
| 5,910,165 A * | 6/1999 | Haramoto et al. | 62/474 |
| 6,167,720 B1 | 1/2001 | Chisnell | |
| 6,235,192 B1 * | 5/2001 | Melfi et al. | 210/136 |
| 6,381,983 B1 * | 5/2002 | Angelo et al. | 62/474 |
| 6,558,457 B1 | 5/2003 | Kolczyk | |

* cited by examiner

MOLDED CORE FILTER DRIER WITH FILTER MEDIA MOLDED TO CORE

CROSS REFERENCE TO RELATED APPLICATIONS

Continuation-in-part of Utility Application No. 10/057,207 filed Jan. 25, 2002.

BACKGROUND OF THE INVENTION

This invention relates generally to filter-driers for refrigeration systems and particularly to a casing and a molded filter-drier core having superior structural characteristics of attrition resistance, strength and permeability while being held firmly in place by structural cooperation between the casing and the core.

Filter-driers are used in refrigeration systems to filter solid contaminants and to remove soluble contaminants from the refrigerant and lubricant. The three general types of construction of filter-driers are loose fill, compacted bead, and molded core.

In a loose fill design, the desiccant is captured within mesh screens to prevent the desiccant beads from escaping into the system. The beads form a desiccant bed trapped between the shell and mesh screens, however, within the desiccant bed the beads are only loosely held. Flow of refrigerant through the desiccant bed or vibration of the filter-drier shell from other sources results in undesirable movement of the individual beads within the bed. Contact of the desiccant beads with the shell, mesh screens, or other desiccant beads can lead to attrition of the desiccant beads. As attrition of the beads progresses, the desiccant fines escape the mesh screens and circulate in the refrigerating system.

Compacted bead designs use desiccant beads similar to the loose fill design but incorporates perforated metal and mesh screens, filter pads, and springs to compact the desiccant bed. The compaction of the desiccant bed restricts the movement of the individual beads compared to a loose fill design and reduces the risk of attrition, however, this design does not eliminate attrition.

A molded core unit consists of a molded desiccant block held in place with support screens, filter pads, and springs. The molded core is made of smaller granules of desiccant than the loose fill or compacted bead design. The desiccant granules are bonded together using an organic or inorganic binder to form a solid shape. This design prevents attrition of the desiccants by not allowing movement of the granules.

Typically, shells to contain the desiccants in a filter-drier are either welded steel shell consisting of steel tubing and/or stamped pieces welded together to form a sealed shell. Alternatively, copper spun shells may be used in which copper tubing is reduced to a specific fitting size. Prior to welding a steel shell or spinning to reduce the diameter of the copper tubing, the internal parts consisting components such as perforated screens, mesh screens, filter pads, desiccant, and springs are assembled. The purpose of the screens and springs is to contain the desiccant beads or desiccant core.

Known filter-drier units having molded cores and incorporated herein by reference, are disclosed in U.S. Pat. No. 2,556,292, U.S. Pat. No. 5,440,898, U.S. Pat. No. 5,562,427 and U.S. Pat. No. 2,551,426. U.S. Pat. No. 2,556,892 discloses a core formed from molded discs and U.S. Pat. No. 5,440,898 disclosed a molded core which is strengthened by the use of fibers. In both cases, the core is spaced from an outer metal casing and held in place by a lateral support system at each end. U.S. Pat. No. 5,562,427 discloses a copper casing with longitudinally spaced grooves formed to hold a preformed solid core. The grooves are formed by the drawing process but are at each end of the core. U.S. Pat. No. 2,551,426 discloses a preformed block of drying agent which is supported by longitudinally spaced internal protrusions.

The present system overcomes the need for support systems for holding the core in place in a manner not disclosed in the known prior art.

SUMMARY OF THE INVENTION

This molded core filter drier does not require additional parts to hold the core in place within the casing and the core is formed within the casing and held within the casing by structural cooperation between the casing and the core. The binder used in the molded core serves to bind the desiccants together and, in addition, binds the desiccant core to the casing. Thus movement between the core and the casing is prevented thereby substantially eliminating desiccant attrition. It is an advantage to provide a filter bonded to the core.

This filter-drier is for drying refrigerant circulated in a refrigeration system by removing moisture therefrom, and comprises a casing having an inlet for receiving refrigerant, and an outlet for discharging refrigerant. The casing includes opposed end portions and an intermediate portion disposed between said end portions. A molded core including inlet and outlet end portions is provided disposed in said casing between said inlet and outlet and receiving flow of refrigerant therethrough and holding means is provided between the casing and said core for holding the core in place within the casing and a filter is bonded to the core, as by molding.

It is an aspect of this invention to provide that the filter is bonded to at least one of said molded core end portions.

It is another aspect of this invention to provide the filter is bonded to said molded core outlet end portion.

It is still another aspect of this invention to provide that the core includes a passage having a closed end proximate the inlet portion and an open end proximate the outlet portion; and the passage is lined, at least in part, with the filter.

It is yet another aspect of this invention to provide that the core passage includes inclined sides.

It is an aspect of this invention to provide that the core passage is generally conical.

It is yet another aspect of this invention to provide that the core passage open end includes an annular portion, and the filter is bonded to said annular portion.

It is an aspect of this invention to provide a filter-drier comprising a casing having an inlet for receiving refrigerant, and an outlet for discharging refrigerant. The casing includes opposed end portions and an intermediate portion disposed between said end portions and having an inner surface. A molded core is provided including an outer surface and inlet and outlet end portions disposed in said casing between said inlet and outlet and receiving flow of refrigerant therethrough ;and holding means is provided between said casing inner surface and said core outer surface for holding the core in place; and a filter media is molded to the core.

It is another aspect of this invention to provide that the holding means includes at least one protrusion from the inner surface of the casing engaging the outer surface of the core to inhibit axial movement of the core.

It is still another aspect of this invention to provide that the holding means includes bonding means between the inner surface of the casing and the outer surface of the core to inhibit axial movement of the core.

It is an aspect of this invention to provide a method of manufacturing a filter-drier having a tubular casing and a desiccant core between an inlet and an outlet comprising the steps of: providing a tubular mold; providing a mold base associated with the tubular mold; placing a filter media on the mold base; depositing a desiccant/binder mix within the mold and over the filter media to bond the filter media to the core; providing a mold cap over the desiccant core; and removing the mold base and cap when the core has set.

It is another aspect of this invention to provide a method wherein the filter media is disposed at the outlet of the core and to provide the additional step of compressing the desiccant/binder with the cap.

It is an aspect of this invention to provide that the filter media is molded to the core.

This filter-drier is relatively inexpensive and simple to manufacture and is particularly effective for its intended purpose.

DESCRIPTION OF THE PREFERRED EMBODIMENT

Figure 1:
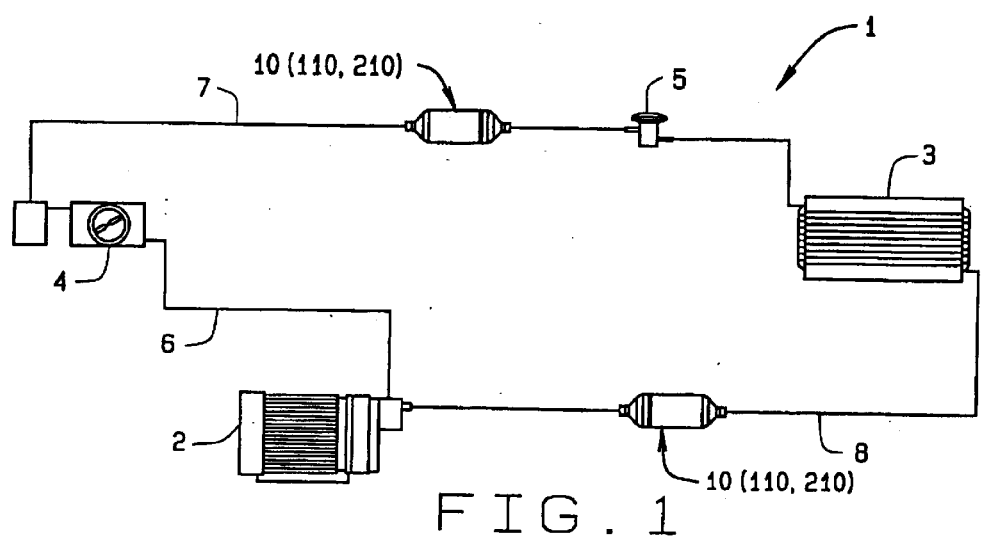
FIG. 1 is a diagrammatic view of a refrigeration system utilizing a filter-drier assembly in the liquid line and in the suction line.
Figure 2:
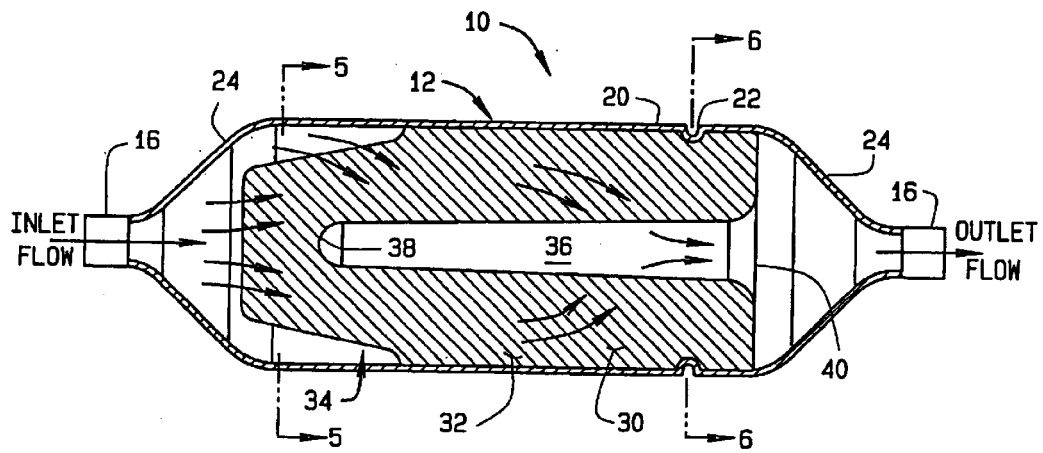
FIG. 2 is a longitudinal cross-sectional view of the filter-drier assembly.

Referring now by reference numerals to the drawings and first to FIG. 1, it will be understood that one or more filter-drier assemblies 10 are used in a refrigeration system 1 which includes a compressor 2, an evaporator 3, a condenser 4 and an expansion device 5 such as a thermostatic expansion valve.

In the embodiment shown, a hot gas line 6 is provided between the compressor 2 and the condenser 4. A liquid line 7 is provided between the condenser 4 and the expansion device 5 and a suction line 8 is provided between the evaporator 3 and the compressor 2. A first filter-drier assembly 10 is disposed in line 7 between the condenser 4 and the expansion device 5. Also, in the embodiment shown, a second filter-drier assembly 10 is disposed in the suction line 8 between the evaporator 3 and the compressor 2.

Figure 3:
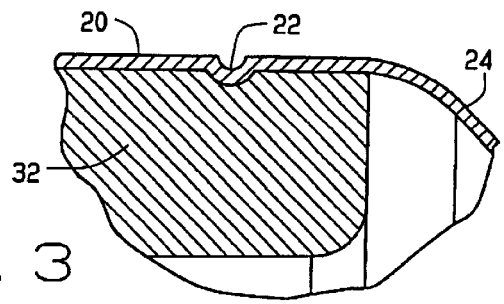
FIG. 3 is an enlarged fragmentary view of the holding indentation.
Figure 4:
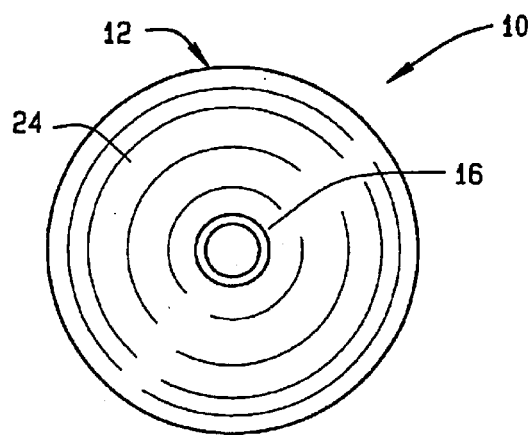
FIG. 4 is an end view of the filter-drier assembly.
Figure 5:
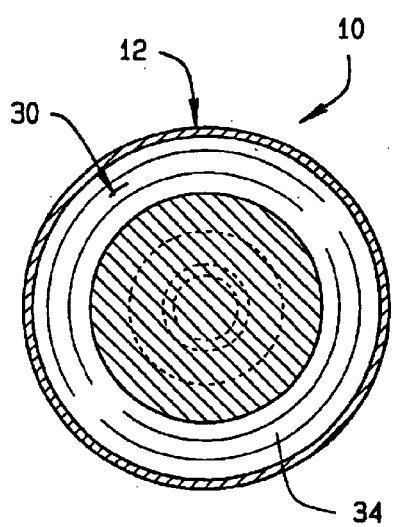
FIG. 5 is a cross-sectional view taken on line 5—5 of FIG. 2.
Figure 6:
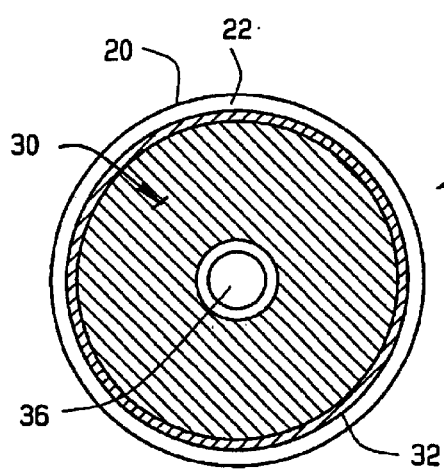
FIG. 6 is a cross-sectional view taken on line 6—6 of FIG. 2.

More specifically, the filter-drier assembly 10 includes a casing 12 and a molded core 30. The casing 12 includes inlet and outlet nozzle fittings 16 and 18, and a cylindrical intermediate portion 20. As shown in FIGS. 3 and 6, the intermediate portion 20 includes an inwardly protruding U-shaped circular indention 22, located closer to the outlet 18 than the inlet 16, in the embodiment shown, and opposed funnel-shaped transition portions 24.

The molded core 30 is disposed within the casing 12 and includes a cylindrical portion 32 disposed in engaging relation to the cylindrical casing portion 20. The molded core 30 may also include a frusto-conical portion 34 at the inlet end spaced from the casing and a passage 36 having a closed end 38 and an open end 40 disposed at the outlet end of the casing.

The permeable molded desiccant core 30 includes a binder and is molded in place within the casing after formation of the circular indentation 22 but before the transition portions 24 are formed. In the embodiment shown, the relatively short tubular casings 12 may be provided by sections cut from a relatively long copper tube. In this case the indentations may be created in the elongate tube prior to cutting the tube into sections. Also, in the embodiment shown, the tubular casing is formed of spun copper and the transition portions are created by the spinning process. The core 30 is molded in place and the cylindrical portion 32 of the core outer surface is in adhering contact engagement with the inside wall of the cylindrical casing portion 20 after the core is molded. Because of this structural arrangement of parts, the circular indentation 22 is molded into the core material which is molded in place about the indentation. Following the core molding procedure the casing transition portions 24 are reduced to the generally funnel-shaped configuration shown and the inlet and outlet fittings 16 and 18 are emplaced at opposite ends.

With the structural arrangement of casing and core parts shown, the molded core is held in place by bonding between the outer surface of the core and the inner surface of the casing, said bonding constituting a holding means. In addition, the provision of the circular indentation 22 holds the core in place mechanically by the tongue and groove effect between the casing 12 and the molded core 30 and constitutes another holding means. Thus, the core may be held by one of two holding means or by both holding means.

Molding the desiccant core around the indentation utilizes the strength of the molded core and greatly increases the force required to move the core 30 within the casing 12. In the event that the bond between the molded core and the casing, which is provided by the binder, is destroyed during the production process or during installation, the mechanical retention provided by the indentation is sufficient to prevent movement of the core within the casing.

The configuration and permeability of the molded core are optimized to ensure sufficient refrigerant flow characteristics, desiccant core weight and filtration performance.

In operation, refrigerant flowing through the system is received into the casing at the inlet 16, and enters the core 30 at the surface provided by the frusto-conical portion 34. The refrigerant enters the passage 36 through the core frusto-conical portion 34 and the cylindrical portion 32 as indicated by the arrows and is discharged at the outlet 18. It will be understood that while the frusto-conical portion 34 has some advantage in that a greater surface area is provided for receiving the refrigerant, the core 30 may be formed without a frusto-conical end.

Figure 7:
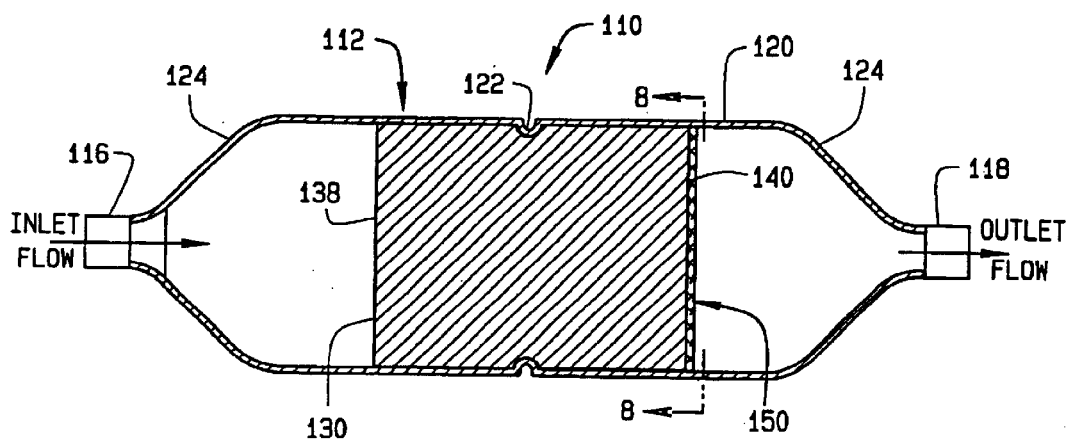
FIG. 7 is a longitudinal cross-sectional view of a modified filter-drier assembly.
Figure 8:
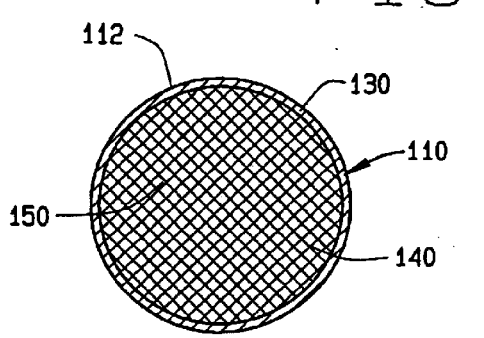
FIG. 8 is a cross-sectional view taken on line 8—8 of FIG. 7.

A modified filter-drier 110 is shown in FIGS. 7 and 8 which is similar to the filter-drier 10 shown in FIGS. 1–6, in that it includes a casing 112 having a molded core 130 held in place by bonding between the inner surface of the casing 112 and the outer surface of the core 130, and by the provision of a circular indentation 122 which holds the molded core 130 in place mechanically by the tongue and groove effect between the casing 112 and the core 130. For this reason, similar parts are given similar identification numerals with the addition of a prefix numeral "1". The modified filter-drier 110 is different from the filter-drier 10 in that it includes a filter media pad 150 at the outlet of the core 130 bonded to said core. The strength of the bond between the filter pad 150 and the core 120 ensures that the filter pad 150 is held securely in place and eliminates the need for outlet support screens. The refrigeration system, shown in FIG. 1 is unchanged.

More specifically, and referring again to the embodiment shown in FIGS. 7 and 8, the filter-drier assembly 110 includes a casing 112 and a molded core 130. The casing 112 includes inlet and outlet nozzle fittings 116 and 118 and a cylindrical intermediate portion 120. The intermediate portion 120 includes an inwardly protruding indentation 122 located between the outlet 118 and the inlet 116 and the casing 112 includes opposed funnel-shaped transition portions 124.

The molded core 130 is disposed within the casing 112 and is cylindrical in configuration having generally flat circular ends 138 and 140 providing an inlet and an outlet for the circular core.

The permeable molded desiccant core 130 includes a binder and is molded in place within case 112 after the formation of the circular indentation 122 but before the transition portions 124 are formed. The core 130 outer surface is in adhering contact engagement with the inside wall after the core 130 is molded. As with the previous embodiment, the core 130 may be held in place mechanically by the casing groove 122 or by the adhesive effect of the bond between the molded core 130 and the casing 112 or both.

Distinguishing between the previous embodiment shown in FIGS. 1–6, the filter-drier 110 includes a circular pad 150 of filter media bonded to the molded core 112. In the embodiment shown, this pad 150 is disposed on the flat outlet end 140 of the molded core 130. Because of this preferred arrangement there is no compressive force from the flow of refrigerant on the pad 150 and therefore no tendency for flow to be restricted by an effective reduction of the thickness of the pad, it being understood that compression of a filter pad 150 alters the flow and filtration characteristics. Since the filter pad 150 is not compressed, the original characteristics of the pad are retained. There is also an advantage in the use of a pad at the inlet end 138, in lieu of or as well as, the outlet end, because, to whichever end of the core it is bonded it eliminates the need for filter pads held in place by metal screen or similar devices. The use of a filter media molded to the desiccant core may be used in the liquid or suction line of the refrigeration system shown in FIG. 1.

Figure 10:
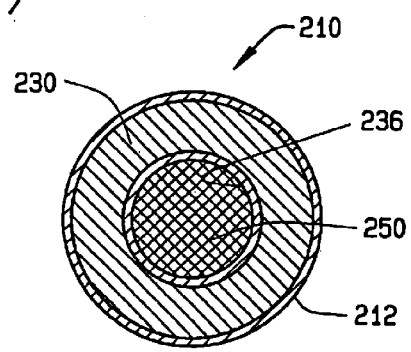
FIG. 10 is a cross-sectional view taken on line 10—10 of FIG. 10.
Figure 9:
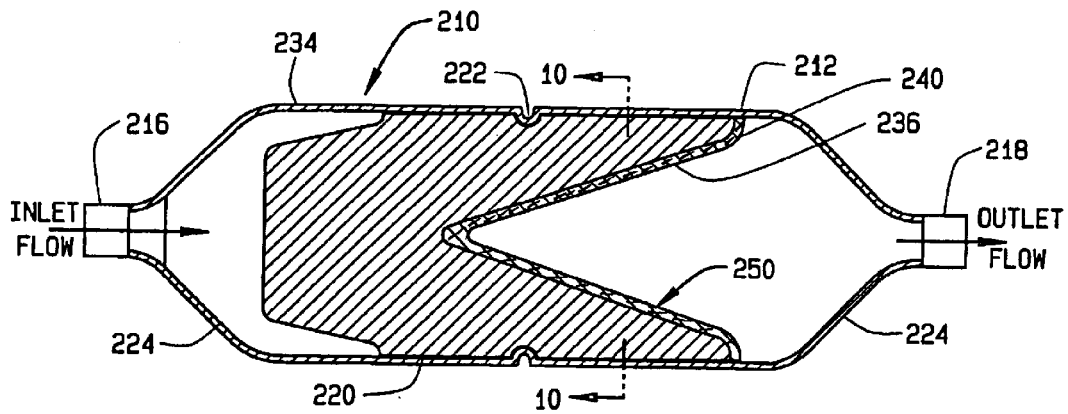
FIG. 9 is a longitudinal cross-sectional view of another modified filter-drier assembly.

A second modified filter-drier assembly 210 is shown in FIGS. 9 and 10. In this embodiment, the reference numerals are similar for similar parts with the addition of the numeral "2". As shown, the filter-drier assembly 210 includes a casing 212 similar to that shown in the previous embodiment but the core 230 is different, in that it includes a frusto-conical portion 234 at the inlet end and a recessed conical portion 236 and an annular portion 240 at the outlet end. This arrangement provides that the inlet and outlet areas of the core 230, are increased. More specifically, the filter media pad 250 conforms to the shape of the recessed conical portion 236 and annular portion 240, which helps to optimize the flow characteristics since the filter pad 250 is not under compression.

Figure 11:
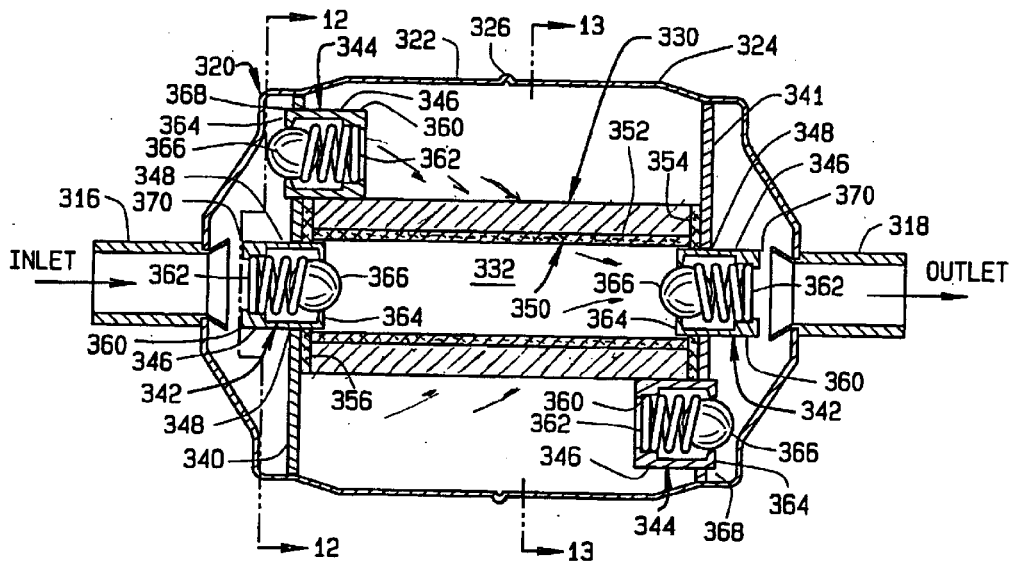
FIG. 11 is a longitudinal cross-sectional view of another modified filter-drier assembly.
Figure 14:
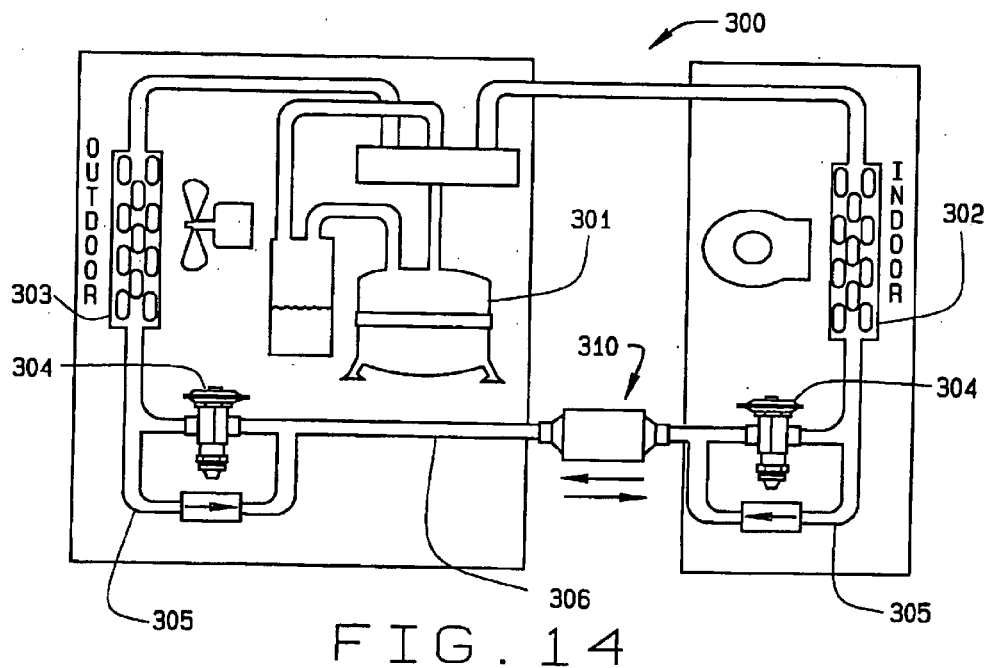
FIG. 14 is a diagrammatic view of a heat pump utilizing the filter-drier of FIGS. 11–13 in the reversing liquid line.
Figure 12:
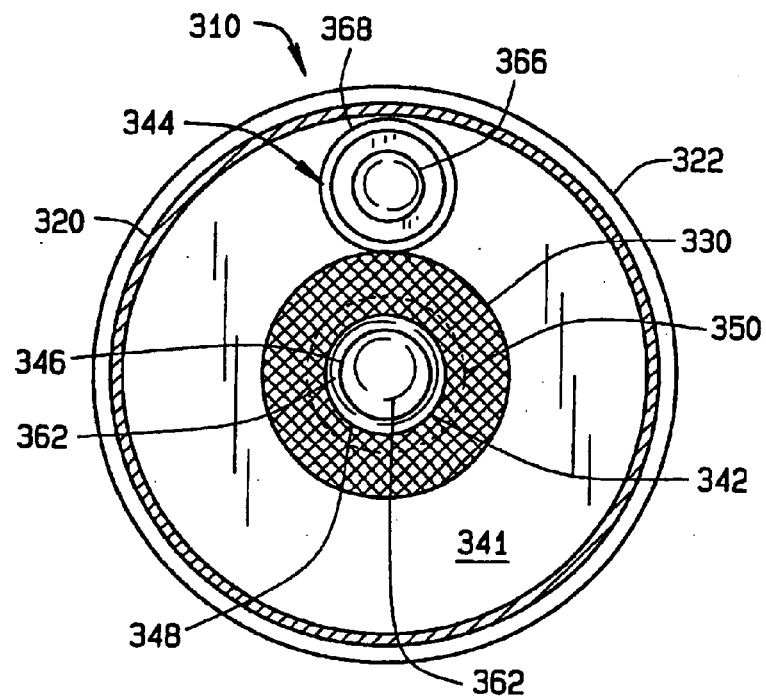
FIG. 12 is a cross-sectional view taken on line 12—12 of FIG. 11.
Figure 13:
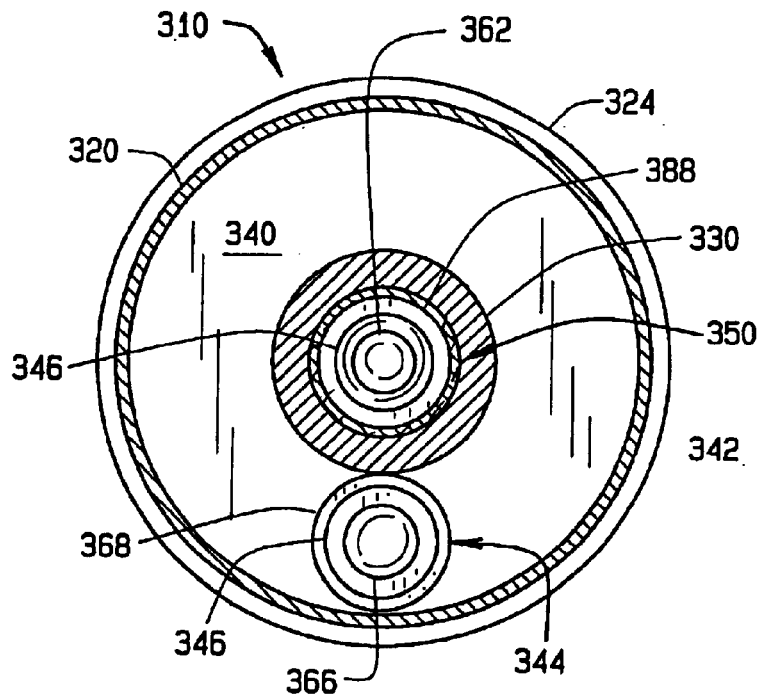
FIG. 13 is a cross-sectional view taken on line 13—13 of FIG. 11.

A third modified filter-drier assembly 310 is shown in FIGS. 11–13. This assembly is intended for use in the reversing liquid line of a heat pump of the type shown in simplified form in FIG. 14. The heat pump 300 requires a filter-drier assembly having a reversible construction providing two-way flow capability. The heat pump 300 includes a compressor 301, an evaporator 302, a condenser 303 and two thermal expansion valve assemblies 304, each having a check valve 305. The reversing liquid line 306 between two thermal expansion valve assemblies 304 includes a heat pump filter-drier which is shown in detail in FIGS. 11–13.

The reversible filter-drier 310 includes a two-part casing 320 consisting of opposed half-portions 322 and 324 connected at a joint 326 by welding, or otherwise. Supported within the casing 320 by circular end plates 340 and 341 is a hollow cylindrical core 330 defining a filter lined passage 332. The circular end plates 340 and 341 each includes an axially aligned check valve 342 and an offset check valve 344. The axially aligned check valves include a tubular member 346 welded, or otherwise attached, to a central opening 348 in each end plate 340 and 341. The tubular member 346 includes an annular abutment 360 at the outer end supporting a spring 362 and a coined abutment 364 at the inner end supporting a ball 366. The offset check valves 344 are similar to check valve 342 in that they include a tubular member 346 welded, or otherwise attached, to an offset opening 368 in each end plate 340 and 341. The tubular member 346 includes an annular abutment 360 at the inner end supporting a spring 362 and a coined abutment 364 at the outer end support a ball 366. There is a gap 370 between each inlet and outlet fitting 316 and 318, respectively, and the associated axially aligned tubular member 342 and 344, respectively.

The cylindrical core 320 includes a filter media 350 disposed about the core 320 having a tubular portion 352 and annular end portions 354 and 356. The core and filter media combination 320, 350 is supported between the axially aligned check valves 342 and 344.

In operation, in the position shown in FIG. 11, refrigerant enters the inlet 316 and passes radially outwardly through the gap 370 to open check valve 344 and then flows radially inwardly through the tubular core 330 and the filter lining 350 into the passage 332 aligned with the check valves 342 and out through the outlet 318. In the reverse operation, the procedure is identical with the outlet becoming the inlet.

As well-known to those skilled in the art, the desiccants most commonly used in filter-driers are molecular sieve, activated alumina and activated carbon. Less commonly used is silica gel. Binders may be organic, typically polymers such as epoxy or phenolic, or inorganic such as phosphates or silicate. The core porosity, as is well known to those skilled in the art, depends upon the particular desiccant and binder selected and the flow rate required and other readily determinable factors.

The outlet filter media is typically a woven or wound fiber such fiber glass, polyester and polypropylene. It is desirable to use a filter media material that is manufactured to eliminate loose fibers that could escape into the system rather than a media that contains loose fibers.

Preferably, the filter media is bonded to the desiccant core during the molding process and additional binder is not required. The bonding could be accomplished in a second step but is less desirable because it requires an additional step in the process than when it is molded to the core.

As will be readily understood by those skilled in the art the type and density of filter media is chosen based on factors such as compatibility with refrigerants and lubricants, durability, and filtration characteristics. A filter mesh of 5–80 microns with a pad or filter element depth of about 0.1 inch is satisfactory for most filter-drier purposes but the specific purpose for which the filter media is to be used will enable those skilled in the art to determine the filter mesh and depth appropriate for that purpose.

FIGS. 15-17 and FIGS. 18-20 are schematics illustrating stages in the method of forming the filter-driers cores shown in FIGS. 9 and 11, respectively.

Figure 15:
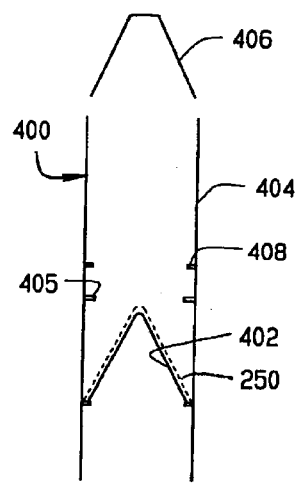
FIGS. 15–17 are schematics illustrating the first, second and third stages of forming the filter-drier of FIG. 9.
Figure 16:
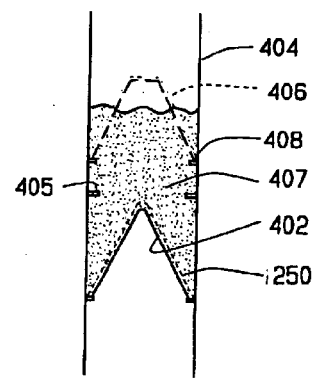
Figure 17:
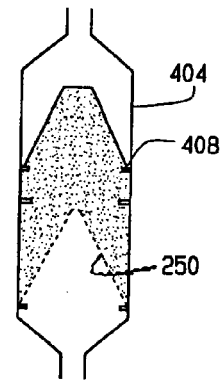

Referring first to FIGS. 15-17, it will be understood from FIG. 15 that the mold assembly 400 initially consists of a bottom mold base 402 which determines the shape of the outlet of the core, a side tube 404, having a holding ring 405, which determines the diameter of the core, and a top mold cap 406 which determines the shape of the inlet of the core. In the process of forming the core, the side tube 404 is placed on the mold base 402. In the embodiment shown, a preformed, conical filter media 250 is placed over the mold base prior to adding the desiccant/binder mix to firmly bond the filter media to the core. As shown in FIG. 16, the desiccant/binder mix is deposited into the tube to a level less than that of the frusto-conical outlet. The mold cap 406 is then placed inside the tube and the desiccant mix is compressed, as shown in dotted outline, in FIG. 16 to a marker stop 408 to complete the molded core as shown in FIG. 17 to eliminate unnecessary voids in the core and ensure a good bond with the filter media. The core binder is allowed to set and the mold base 402 and cap 406 are removed from the mold. Where the core is intended to be molded to the shell, the side tube 404 becomes the shell and is not removed from the core but rather becomes part of the filter-drier. As shown in FIG. 17, the reduced transitional end portions of the side tube 404 are formed to complete the filter-drier shell after the base mold 402 and cap mold 406 are removed.

Figure 18:
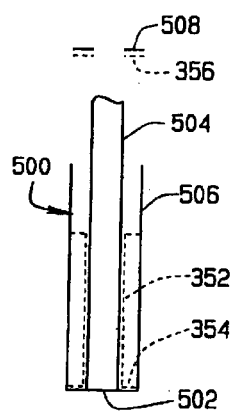
FIGS. 18–20 are schematics illustrating the first, second and third stages of forming the core of the filter-drier of FIG. 11.
Figure 19:
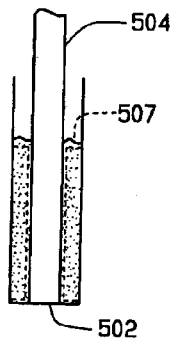
Figure 20:
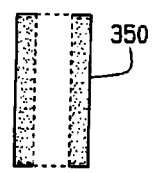

Referring to FIGS. 18-20, it will be understood from FIG. 18 that the mold assembly is for manufacturing a filter-drier desiccant core for a heat pump of the type shown in FIG. 11. The mold assembly 500 initially consists of a mold base 502, a center post 504 and a tubular mold 506. Filter media portions in the form of a tube 352 and an annular end 354 are placed over the mold base 502 and the center post 504 that forms the inner diameter of the core within the tube 506 that forms the outer diameter of the core. As shown in FIG. 19, the desiccant/binder mix 505 is added to a height slightly greater than the finished length of the core and an annular piece of filter media 356 is placed in the mold prior to the fitting of a mold cap 508 which is then compressed to the finished size of the filter-drier core to eliminate unnecessary voids in the core and ensure a good bond with the filter media. The core binder is allowed to set and the mold base 502, the center post 504, the tube 506 and the mold cap 508 are removed leaving the core with the filter media elements in place as shown in FIG. 20, ready for use in the heat pump filter drier shown in FIG. 11.

The invention has been described by making reference to a preferred filter-drier core construction. However, the details of description are not to be understood as restrictive, numerous variants being possible with the principles disclosed and within the fair scope of the claims hereunto appended.

I claim:

1. A filter-drier for drying refrigerant circulated in a refrigeration system by removing moisture therefrom, the filter-drier comprising:

a casing having an inlet for receiving refrigerant, and an outlet for discharging refrigerant, the casing including opposed end portions and an intermediate portion disposed between said end portions;

a molded core including inlet and outlet end portions disposed in said casing between said casing inlet and outlet and receiving flow of refrigerant therethrough;

holding means between said casing and said care for holding the core in place; and a filter bonded to the core by adhesive.

2. A filter-drier as defined in claim 1, wherein:

the filter is bonded to at least one of said molded core end portions.

3. A filter-drier as defined in claim 2, wherein:

the filter is bonded to said molded core outlet end portion.

4. A filter-drier for drying refrigerant circulated in a refrigeration system by removing moisture therefrom, the filter-drier comprising:

a casing having an inlet for receiving refrigerant, and an outlet for discharging refrigerant, the casing including opposed end portions and an intermediate portion disposed between said end portions;

a molded core including inlet and outlet end portions disposed in said casing between said casing inlet and outlet and receiving flow of refrigerant therethrough;

holding means between said casing and said core for holding the core in place; a filter bonded to the core;

the filter being bonded to at least one of said molded core end portions;

the core including a passage having a closed end proximate the inlet portion and an open end proximate the outlet portion; and the passage being lined, at least in part, with the filter.

5. A filter-drier as defined in claim 4, wherein:

the core passage includes inclined sides.

6. A filter-drier as defined in claim 4, wherein:

the core passage is generally conical.

7. A filter-drier as defined in claim 4, wherein:

the core passage open end includes an annular portion, and the filter is bonded to said annular portion.

8. A filter-drier for drying refrigerant circulated in a refrigeration system by removing moisture therefrom, the filter-drier comprising:

a casing having an inlet for receiving refrigerant, and an outlet for discharging refrigerant, the casing including opposed end portions and an intermediate portion disposed between said end portions and having an inner surface;

a molded core including an outer surface and inlet and outlet end portions disposed in said casing between said inlet and outlet and receiving flow of refrigerant therethrough;

holding means between said casing inner surface and said core outer surface for holding the core in place; and a filter media is molded to the core by adhesive.

9. A filter-drier as defined in claim 8, wherein:

the holding means includes at least one protrusion from the inner surface of the casing engaging the outer surface of the core to inhibit axial movement of the core.

10. A filter-drier as defined in claim 8, wherein:

the holding means includes bonding means between the inner surface of the casing and the outer surface of the core to inhibit axial movement of the core.

11. A filter-drier for drying refrigerant circulated in a refrigeration system by removing moisture therefrom, the filter-drier comprising;

a casing having an inlet for receiving refrigerant, and an outlet for discharging refrigerant, the casing including opposed end portions and an intermediate portion disposed between said end portions;

a molded core including inlet and outlet end portions disposed and held in said casing between said casing inlet and outlet and receiving flow of refrigerant therethrough; and a filter bonded to the core by adhesive.

12. A filter-drier as defined in claim 11, wherein:

the filter is bonded to at least one of said molded core end portions.

13. A filter-drier as defined in claim 12, wherein:

the filter is bonded to said molded core outlet end portion.

14. A filter-drier for drying refrigerant circulated in a refrigeration system by removing moisture therefrom, the filter-drier comprising:

a casing having an inlet for receiving refrigerant, and an outlet for discharging refrigerant, the casing including opposed end portions and an intermediate portion disposed between said end portions;

a molded core including inlet and outlet end portions disposed and held in said casing between said casing inlet and outlet and receiving flow of refrigerant therethrough;

a filter bonded to the core, the filter being bonded to at least one of said molded core end portions;

the core including a passage having a closed end proximate the inlet portion and an open end proximate the outlet portion; and the passage being lined, at least in part, with the filter.

15. A filter-drier for dying refrigerant circulated in a refrigeration system by removing moisture therefrom, the filter-drier comprising:

a casing having an inlet for receiving refrigerant, and an outlet for discharging refrigerant, the casing including opposed end portions and an intermediate portion disposed between said end portions;

a molded core including inlet and outlet end portions disposed and held in said casing between said casing inlet and outlet and receiving flow of refrigerant therethrough;

a filter bonded to the core; and the core being formed from a desiccant/binder mix and the filter being bonded to the core by the binder.

* * * * *